United States Patent
Jarrier et al.

(10) Patent No.: US 8,273,158 B2
(45) Date of Patent: Sep. 25, 2012

(54) MIST ELIMINATOR, MOISTURE REMOVAL SYSTEM, AND METHOD OF REMOVING WATER PARTICLES FROM INLET AIR

(75) Inventors: Etienne Rene Jarrier, Alton (GB); John Davies, Alton (GB); Paul Bryant, Alton (GB)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 12/954,956

(22) Filed: Nov. 29, 2010

(65) Prior Publication Data

US 2012/0132075 A1    May 31, 2012

(51) Int. Cl.
*B01D 45/00* (2006.01)

(52) U.S. Cl. .......... 95/267; 55/482; 55/485; 55/428; 55/495; 55/497; 55/501; 55/511; 55/462; 55/465; 55/DIG. 17; 55/DIG. 18; 95/273; 95/287; 96/108

(58) Field of Classification Search .......... 55/482, 55/485, 428, 495, 497, 501, 511, DIG. 17, 55/DIG. 18, 462, 465; 95/273, 287; 96/108
See application file for complete search history.

(56) References Cited

U.S. PATENT DOCUMENTS

| | | | |
|---|---|---|---|
| 3,748,832 A | 7/1973 | Furlong et al. | |
| 3,870,488 A * | 3/1975 | Arndt et al. | 55/440 |
| 3,912,471 A | 10/1975 | Cotton, Jr. | |
| 4,251,242 A * | 2/1981 | Ito | 96/232 |
| 4,333,749 A | 6/1982 | Holmberg et al. | |
| 4,500,330 A | 2/1985 | Bradley, Jr. et al. | |
| 4,514,202 A | 4/1985 | Kinney, Jr. et al. | |
| 6,250,064 B1 | 6/2001 | Tomlinson et al. | |
| 6,315,804 B1 | 11/2001 | Bradley | |
| 6,368,386 B1 * | 4/2002 | Nelson et al. | 95/268 |
| 6,770,121 B1 * | 8/2004 | Sindel | 95/267 |
| 6,802,690 B2 | 10/2004 | Han et al. | |
| 6,875,256 B2 * | 4/2005 | Gillingham et al. | 95/273 |
| 7,632,339 B2 | 12/2009 | Singh | |
| 2009/0320689 A1 | 12/2009 | Krell et al. | |
| 2011/0315015 A1 * | 12/2011 | Jarrier et al. | 95/280 |

FOREIGN PATENT DOCUMENTS

| | | |
|---|---|---|
| EP | 0012252 A1 | 6/1980 |
| EP | 0050921 A2 | 5/1982 |
| WO | WO0151868 A1 | 7/2001 |

OTHER PUBLICATIONS

"Namib Desert Beetle," http://en.wikipedia.org/wiki/Namib_Desert_beetle, updated Jun. 10, 2010.

(Continued)

*Primary Examiner* — Jason M Greene
*Assistant Examiner* — Dung H Bui
(74) *Attorney, Agent, or Firm* — McNees Wallace & Nurick

(57) ABSTRACT

A mist eliminator including a substrate and a plurality of frusto-conical shaped protrusions disposed on the substrate is provided. The plurality of frusto-conical shaped protrusions have a geometry and are positioned at intervals that provide coalescence and retention of water particles from moisture containing air contacting the substrate and frusto-conical shaped protrusions. A moisture removal system and a method for removing water particles from inlet air with the mist eliminator are also disclosed.

20 Claims, 9 Drawing Sheets

OTHER PUBLICATIONS

"Nanostructured surface mimics Namib desert beetle," http://nanotechweb.org/cws/article/tech/25204, Jun. 26, 2006.

Trafton, Anne, "Beetle Spawns New Material," http://web.mit.edu/newsoffice/2006/beetles-0614.html, Jun. 14, 2006.

Harries-Rees, Karen; "Desert Beetle Provides Model for Fog-Free Nanocoating," http://www.rsc.org/chemistryworld/News/2005/August/31080502.asp, Aug. 31, 2005.

Summers, Adam, "Like Water off a Beetle's Back," Natural History Magazine (http://www.naturalhistorymag.com/print/1934), Feb. 2004.

"Water Vapor Harvesting: Namib Desert Beetle," Ask Nature, http://www.asknature.org/wedbg.php/strategy/pdf/dc2127c6d0008a6c7748e4e4474e7aa1, Jul. 27, 2010.

* cited by examiner

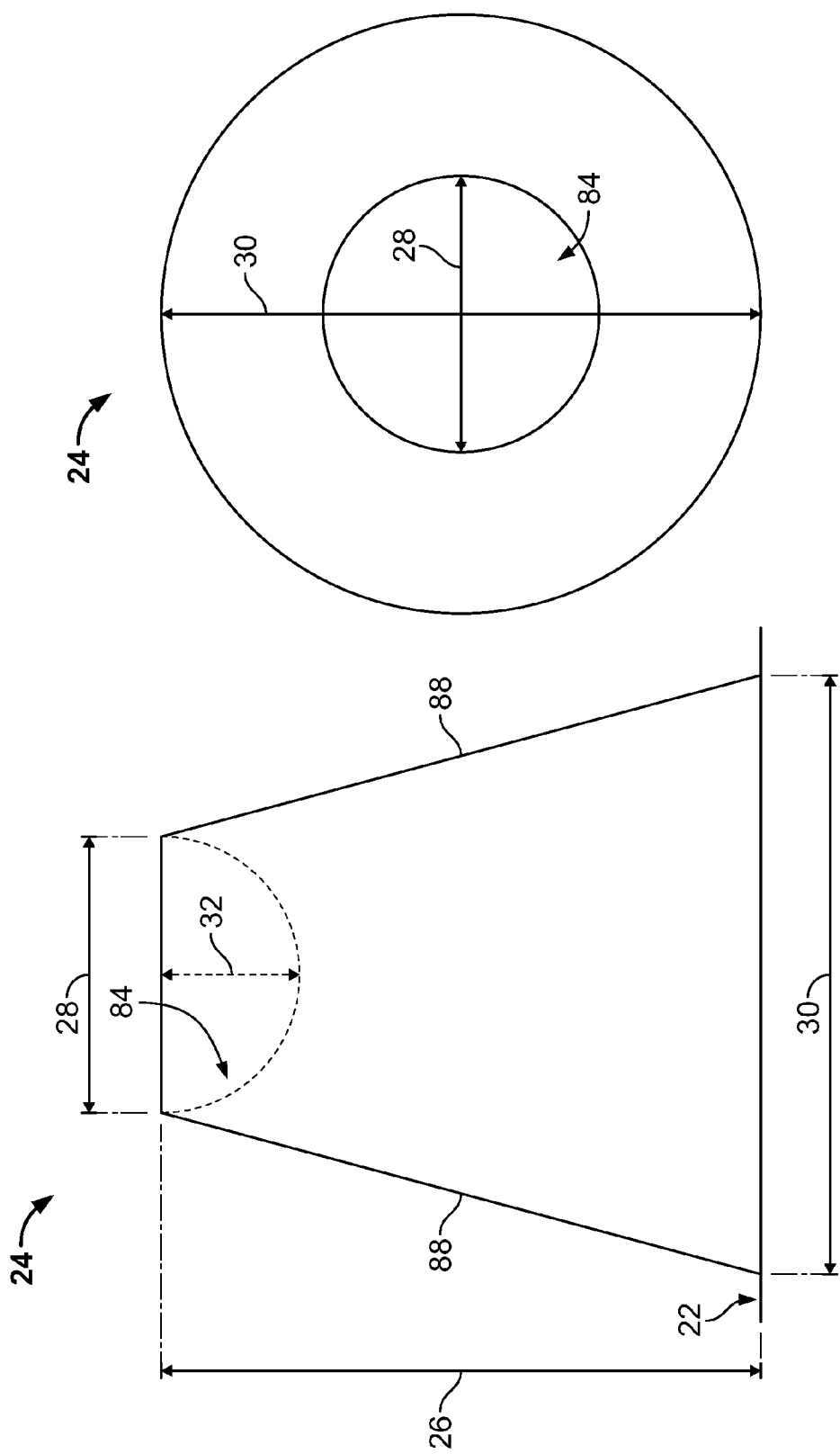

MIST ELIMINATOR, MOISTURE REMOVAL SYSTEM, AND METHOD OF REMOVING WATER PARTICLES FROM INLET AIR

FIELD OF THE INVENTION

The present disclosure relates generally to a water particle removal system. More specifically, the present disclosure is directed to a mist eliminator, a moisture removal system, and method for removing fine water particles from a gas turbine inlet air stream.

BACKGROUND OF THE INVENTION

Some systems for removing moisture from the inlet stream of gas turbines are known. One such known system includes a plurality of filtering mechanisms that filter the inlet air through a plurality of materials and mediums before the inlet air is allowed to proceed to the gas turbine. In one such system, the plurality of filters can include a preliminary filter suspended or attached to the weather hood or hood which is upstream from a primary filter. The filter system is connected by ducting to the gas turbine. The preliminary filters are constructed from filter media that may have hydrophobic properties, for example, a polypropylene fiber material. Filtering mechanisms serve a primary function to filter solid particulates, but typically fail to control moisture.

Fine moisture droplet contamination is particularly problematic in environments having relatively high humidity, such as in marine or off-shore applications, or in conditions such as rain, mist or fog. Where such fine droplets occur, they can migrate through the filter media. This type of fine moisture droplet migration can cause substantial problems with gas turbine operations. It is well known that light rain, mist, and fog create very small moisture droplets or fine water particles that are easily carried in a fast moving stream of air, such as inlet air for a gas turbine. Generally, heavy rain has drops that are too large to be easily carried in a flow of inlet air.

Attempts to collect fine water particles generally in the range of approximately 0.01 micron to approximately 40 microns have been unsuccessful. For example, some filtration systems using filter media experience increased pressure loss across a filter due to the moisture, which results in reduced gas turbine performance during this period of "wet" operation. This is especially true for cellulose fiber filters which swell when they are wet. Some filter media also retain the moisture which can lead to long periods of time when the pressure loss across the filter is elevated.

A mist eliminator, a moisture removal system employing the mist eliminator, and a method of removing water particles from inlet air that do not suffer from the above drawbacks are desirable in the art.

SUMMARY OF THE INVENTION

According to an exemplary embodiment of the present disclosure, a mist eliminator comprising a substrate and a plurality of frusto-conical shaped protrusions disposed on the substrate is provided. The plurality of frusto-conical shaped protrusions have a geometry and are positioned at intervals that provide coalescence and retention of water particles from moisture containing air contacting the substrate and frusto-conical shaped protrusions.

According to another exemplary embodiment of the present disclosure a moisture removal system for a gas turbine is provided. The moisture removal system comprises a housing, a hood, and a plurality of mist eliminators. The housing supports a primary filter, and the housing is operably connected with a gas turbine. The hood is attached to the housing, and the hood includes a surface disposed at an acute angle relative to the horizontal. The plurality of mist eliminators are disposed within the hood, and the plurality of mist eliminator include a substrate, and a plurality of frusto-conical shaped protrusions disposed on the substrate. The plurality of frusto-conical shaped protrusions of the mist eliminator have a geometry and are positioned at intervals that provide coalescence and retention of water particles from moisture containing air contacting the substrate and frusto-conical shaped protrusions.

According to another exemplary embodiment of the present disclosure, a method for removing water particles from inlet air flowing to a gas turbine. The method includes providing a housing for supporting a primary air filter, the housing being operably connected with a gas turbine. The method further includes providing a hood connected with the housing, the hood having a surface disposed at an acute angle relative to the horizontal. The method further includes providing a mist eliminator disposed within the hood, the mist eliminator having a substrate covered with a plurality of frusto-conical shaped protrusions having a geometry and wherein the plurality of frusto-conical protrusions are positioned at intervals that provide coalescence and retention of water particles. The method further includes directing inlet air flow onto the mist eliminator, wherein geometry of the plurality of frusto-conical shaped protrusions coalesce and retain the plurality of water particles from the inlet air into a droplet.

One advantage of an embodiment of the present disclosure includes coalescing fine water particles into larger droplets for removing free moisture particles from the inlet air stream of a gas turbine.

Another advantage of an embodiment of the present disclosure is removing fine water particles from an inlet air stream without causing a pressure loss to the air stream that feeds into the gas turbine.

Another advantage of an embodiment of the present disclosure is removing fine water particles from the inlet air stream without reducing the performance or efficiency of the gas turbine.

Yet another advantage of an embodiment of the present disclosure is that the moisture removal system has little or no clogging.

Another advantage of an embodiment of the present disclosure is that it requires little or no maintenance and easy to clean.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

FIG. 6 is an enlarged view of the frusto-conical shaped protrusion of the mist eliminator as illustrated in FIG. 5.

FIG. 7 is a top view of the frusto-conical shaped protrusion of FIG. 6.

Wherever possible, the same reference numbers will be used throughout the drawings to represent the same parts.

DETAILED DESCRIPTION OF THE INVENTION

Figure 1:
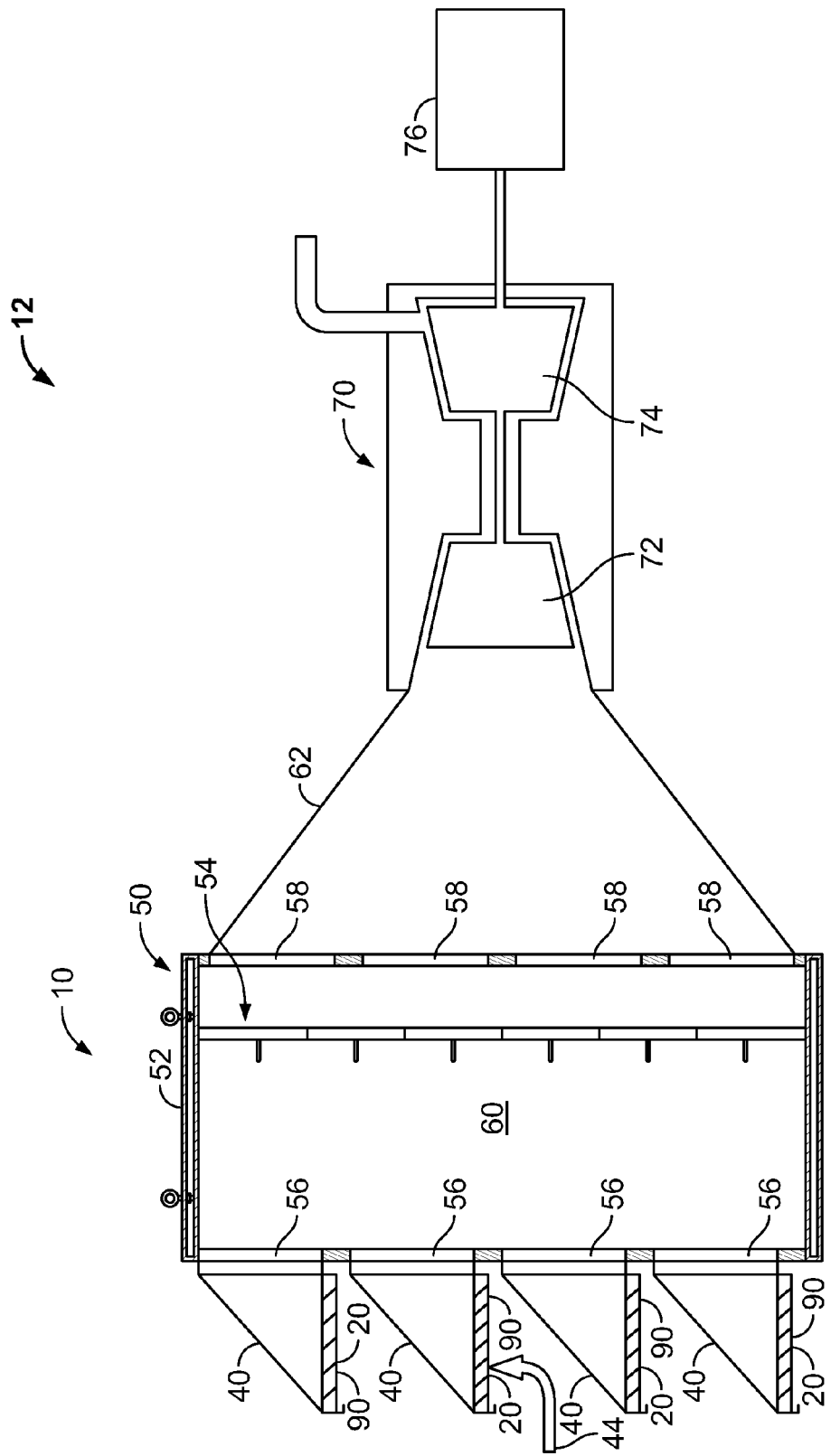
FIG. 1 is a schematic view, partly in section, of gas turbine system including a moisture removal system, constructed according to one aspect of the present disclosure.

Provided is a plurality of mist eliminators 20 and a moisture removal system 10 including the plurality of mist eliminators 20 and method for removal of fine water particles 45 from moisture containing inlet air 44. Embodiments of the present disclosure involve a mist eliminator 20 including a substrate 22 having a plurality of frusto-conical shaped protrusions 24 disposed thereon. The plurality of frusto-conical shaped protrusions 24 have a geometry and are positioned at intervals 34 that provide coalescence and retention of water particles or fine water particles 45 from moisture containing air 44 contacting the substrate 22 and frusto-conical shaped protrusions 24.

FIG. 1 depicts a gas turbine engine 12 including an embodiment of a moisture removal system 10 that eliminates water particles and fine water particles 45 from fog or mist from the inlet air stream 44 to a gas turbine engine 12. By "fine water particles" and its grammatical variations, it is meant that water particle size is approximately less than 40 microns. The moisture removal system 10 includes a housing 52, a hood 40, and at least one mist eliminator 20. In one embodiment, the housing 52 supports a primary filter 54 of a filter system 50 for further filtering of the inlet air of a gas turbine 70. The housing 52 is operably connected with the gas turbine 70 by ducting 62. The gas turbine 70 can be used for any desired purpose, such as powering an electrical generator 76. The gas turbine 70 uses a relatively large quantity of air that is directed to a compressor portion 72, fuel is ignited in the air and the expanding gases ultimately drive a turbine portion 74. The large quantity of inlet air 44 must be filtered and free of particulates, salt, and moisture in order to prevent damage and accelerated wear to components of the gas turbine 70.

Various aspects of the present disclosure are described with respect to a system for a gas turbine engine 12 which are applicable to inlet air intake and down-stream applications, such as for example, but not limited to, removal of water particles in cooling towers and air duct outlets for a gas turbine engine 12. It will be appreciated that the aspects of the disclosure are also applicable to a variety of other applications that are prone to damage by moisture and other particulates. For example, the various aspects of the present disclosure are applicable to applications such as internal combustion engine intake systems, clean room intake systems, heating ventilating and air conditioning (HVAC) systems, hospital HVAC systems and air compressor intake systems.

As shown in FIG. 1, in one embodiment, the filter system 50 includes a housing 52 defining a chamber 60. The chamber 60 has an inlet side 56 and an outlet side 58. The housing 52 is constructed of any suitable material, such as but not limited to, metal framing and sheet metal. The housing 52 can be constructed to have a relatively small footprint. This results because the chamber 60 does not have to provide for collection areas for moisture separated from the inlet air flow 44 since the majority of the moisture removal is accomplished outside the housing 52.

Inlet air 44 enters the chamber 60 through the hood 40. Filtered air 47 exits the hood 40 and enters the housing 52. The housing 52 supports the primary air filter 54. The primary filter 54 functions mainly to remove particulates from the inlet air that could be harmful to the gas turbine 70. The primary filter 54 can be of any suitable construction, such as, but not limited to an array of panel filters. The panel filters are made from any suitable material known in the art for filtering an air inlet stream connected to a gas turbine. It will be appreciated that any suitable filter construction may be used as the primary filter 54, such as without limitation, cartridges or bags.

The moisture removal system 10 includes a plurality of vertically spaced inlet hoods 40 positioned along the inlet side 56 of the chamber 60. The hoods 40 are attached to the housing 52 by any suitable means. Each of the hoods 40 has a surface disposed at an acute angle 82 relative to horizontal. This orientation forces the moisture containing inlet air flow 44 to move initially in an upward direction, as illustrated in FIG. 1. The orientation of the hood 40 also serves to keep relatively large moisture drops, as encountered in heavy rain or snow, from entering moisture removal system 10 via the inlet air flow 44.

Figure 2:
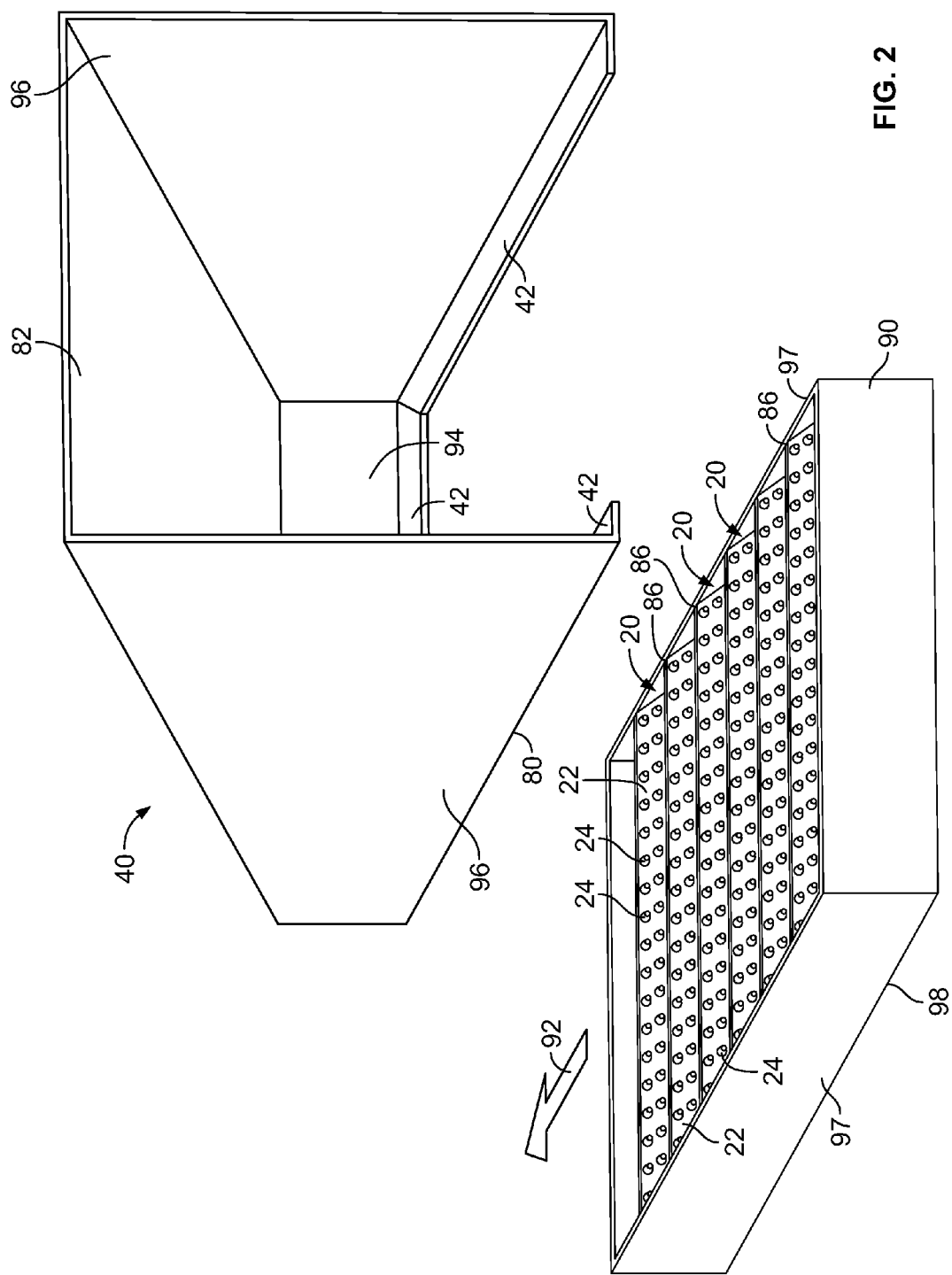
FIG. 2 is a disassembled perspective view of a weather hood and a frame including a plurality of mist eliminators of the present disclosure.

FIG. 2 is a disassembled perspective view of one embodiment of the plurality of mist eliminators 20 disposed within a frame 90 of the present disclosure. In one embodiment, the plurality of mist eliminators 20 are attached to the frame 90 at an attachment point 86, which can include a plurality of attachment means, such as, but not limited to screws, nuts and bolts, adhesives, welds and combinations thereof. In another embodiment, the plurality of mist eliminators 20 are attached to the sides 97 of frame 90. In another embodiment, the plurality of mist eliminators 20 are disposed within the frame 90 and held into place with a plurality slots (not shown) for receiving the mist eliminators 20.

As can be seen in the disassembled view of FIG. 2, the frame 90 will be located slightly above the underside 80 of the hood 40 when assembled. The hood 40 includes a flange 42 or lip located proximate to the underside 80 of the hood 40. The flange 42 is adjacent to the sides 96 and front 94 of the hood 40. To assemble the moisture removal system 10, the frame 90 is inserted or slid into place along the flanges 42 running parallel to the sides 96 of the hood (as indicated by the arrow 92) until the frame 90 reaches the front 94 of the hood 40 or other desired location. See FIG. 3 for an assembled view. When assembled the frame 90 generally covers the opening of the hood 40. The frame 90 is generally constructed from any suitable non-corrosive material, such as, but not limited to polymers, aluminum, galvanized steel, stainless steel, and combinations thereof.

Figure 3:
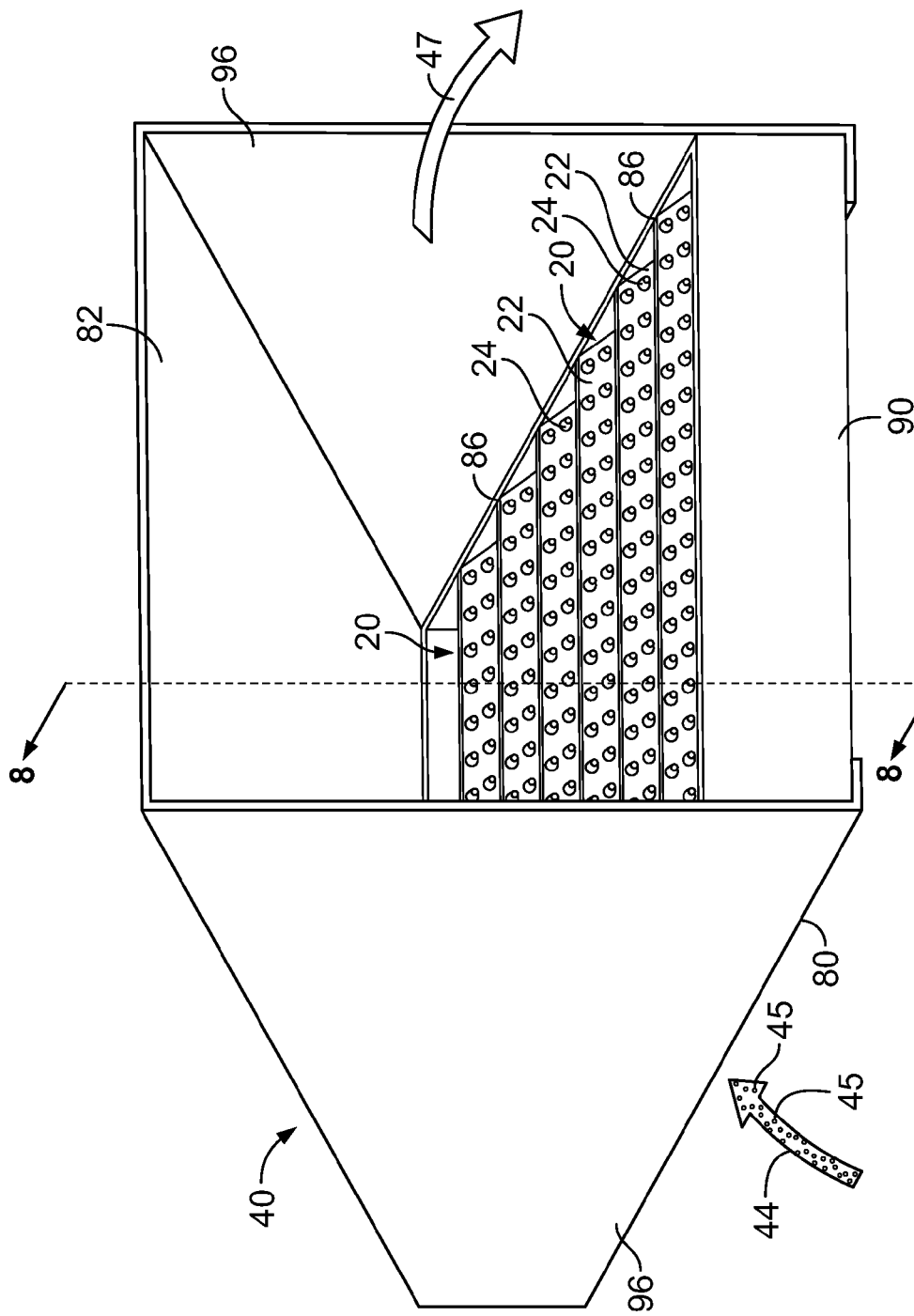
FIG. 3 is an assembled perspective view of a weather hood and frame including a plurality of mist eliminators of the present disclosure.

FIG. 3 is a perspective view of the hood 40 having a plurality of mist eliminators 20 disposed therein. The plurality of mist eliminators 20 are disposed within the frame 90 and hood 40 at an approximately 45 degree angle relative to the horizontal. In another embodiment, the plurality of mist eliminators 20 are disposed within the frame 90 and hood 40 at an approximately 10 degree angle to approximately 90 degree angle relative to the horizontal. In another embodiment, the plurality of mist eliminators 20 are disposed in a number of various angles and combination of angles relative to the horizontal. The frames 90 are generally mounted horizontally in the hoods 40 as shown in FIG. 1. In one embodiment, the plurality of mist eliminators 20, with or without a frame 90, are attached or disposed below the underside 80 of the hood 40. In another embodiment, the mist eliminators 20 are flush with the bottom 98 of the frame 90. As shown in FIG. 3, the moisture containing inlet air flow 44 is forced in an upward direction over each of the plurality of mist eliminators 20, and over the substrate 22 and each of the plurality of frusto-conical shaped protrusions 24 to remove substantially all of the fine water particles 45 from the air flow 47 exiting the hood 40 before the air flow 47 enters the chamber 60.

Figure 5:
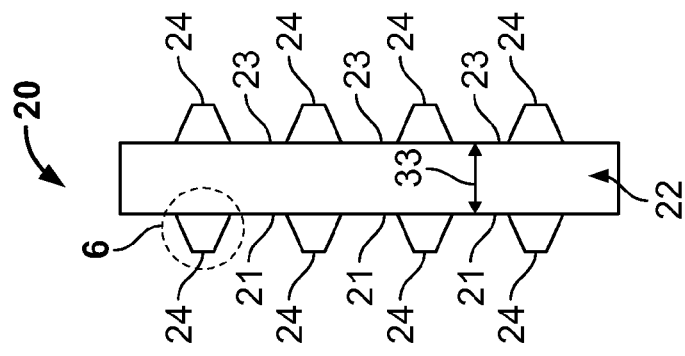
FIG. 5 is a side view of the mist eliminator of the present disclosure.
Figure 4:
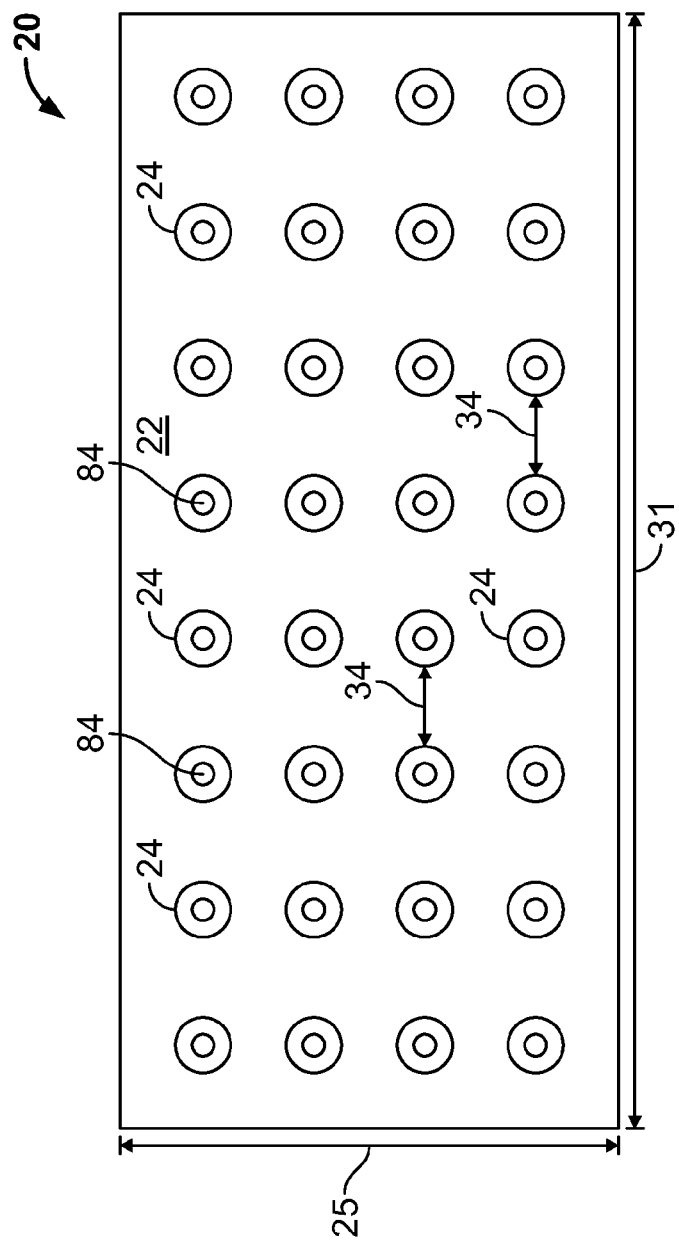
FIG. 4 is a top view of a mist eliminator of the present disclosure.

One embodiment of a mist eliminator 20 is illustrated in FIG. 4. The mist eliminator 20 includes a substrate 22 and a plurality of frusto-conical shaped protrusions 24 (see FIG. 5) disposed on at least one side of the substrate 22. The substrate 22 is substantially planar or substantially curved. As shown in FIGS. 5 and 9, the plurality of frusto-conical shaped protrusions 24 are disposed on a first side 21 and a second side 23 of the substrate 22. In other embodiments, the plurality of frusto-conical shaped protrusions 24 are disposed on only one side of the substrate 22. Returning to FIG. 4, the plurality of frusto-conical shaped protrusions 24 have a geometry and are positioned at intervals 34 that provide coalescence and retention of fine water particles 45 from moisture containing air 44 (see FIG. 8) contacting the substrate 22 and the frusto-conical shaped protrusions 24. In one embodiment, the plurality of frusto-conical shaped protrusions 24 are disposed at evenly spaced intervals 34 on the substrate 22. In another embodiment, the interval 34 between the plurality of frusto-conical shaped protrusions 24 is approximately 100 microns to approximately 10 millimeters (10,000 microns), or approximately 500 microns to approximately 8 millimeters (3000 microns), or approximately 1 millimeter (1000 microns) to approximately 5 millimeters (2000 microns). In yet another embodiment, the interval 34 between the plurality of frusto-conical shaped protrusions 24 is approximately two times that of the second diameter 30 or base of the plurality of frusto-conical shaped protrusions 24. In yet another embodiment, the plurality of frusto-conical shaped protrusions 24 are evenly spaced, unevenly spaced, or combinations thereof.

As shown in FIGS. 6 and 7, the geometry of the plurality of frusto-conical shaped protrusions 24 includes a height 26, a first diameter 28, a second diameter 30, and a depression depth 32. The frusto-conical shaped protrusions 24 are generally volcano-shaped and include a bowl 84 formed therein, which is defined by the first diameter 28 and the depression depth 32. Generally, each of the plurality of frusto-conical shaped protrusions 24 have the same or approximately the same geometry. In an alternative embodiment, each of the plurality or a number of the plurality of frusto-conical shaped protrusions 24 have varying geometries. In one embodiment, the height 26 of the frusto-conical shaped protrusion 24 is approximately 10 microns to approximately 5 millimeters or approximately 20 microns to approximately 3000 microns or approximately 50 microns to approximately 1000 microns. In one embodiment, the first diameter 28 or top of the frusto-conical shaped protrusion 24 is approximately 5 microns to approximately 1000 microns, or approximately 10 microns to approximately 3800 microns, or approximately 50 microns to approximately 500 microns. In one embodiment, the second diameter 30 or base of the frusto-conical shaped protrusion 24 is approximately 100 microns to approximately 2 millimeters (2000 microns), or approximately 250 microns to approximately 1.2 millimeters (1200 microns), or approximately 500 microns to approximately 1 millimeter (1000 microns) In another alternative embodiment, the second diameter 30 or base is approximately two times that of the first diameter 28 or top of the frusto-conical shaped protrusion. In one embodiment, the depression depth 32 or bowl depth of the frusto-conical shaped protrusion 24 is approximately 2.5 microns to approximately 500 microns, or approximately 5 microns to approximately 200 microns or approximately 10 microns to approximately 150 microns. In an alternative embodiment the depression depth 32 is approximately one-half the size of the first diameter 28 of the frusto-conical shaped protrusion 24.

As shown in FIGS. 6 and 7 the frusto-conical shaped protrusion 24 includes a bowl 84 or depression. The bowl 84 is defined by the first diameter 28 and the depression depth 32. In operation, the moisture containing inlet air flow 44 passes over the mist eliminator 20 (see FIGS. 8-11). The moisture containing air flow 44 having water particles 45 is directed upward against the generally slanted sides 88 of the frusto-conical shaped protrusions 24 into the bowl 84. The bowl 84, which includes a rounded surface and surface area collects water particles 45 from the moisture containing inlet air flow 44. The curved surfaces of the bowl 84 create a hydrophilic area to coalesce or collect the water particles 45. It is suspected that the hydrophilic area of the bowl 84 is created because of the aerodynamic effect on a microscale level which is also coupled to a local surface tension effect that is created in the bowl 84. As the moisture containing inlet air flow 44 passes over each of the plurality of frusto-conical shaped protrusions 24, more and more fine water particles 45 are collected from the inlet air flow 44 in the bowl 84. As more fine water particles 45 coalesce in the bowl 84, the hydrophilic area of the bowl 84 and surface tension and attractive forces or cohesion of the already collected water particles continue to collect and coalesce more fine water particles 45. The bowl 84 allows the fine water particles 45 to coalesce into large water droplets 48. By "large water droplets" and its grammatical variations, it is meant that water droplets 48 are generally large enough for gravity to pull the water droplet 48 out of the bowl 84 and that the large droplet 48 has a size that will easily overcome the upward aerodynamic lift of the air being pulled through the hood 40. In one embodiment large water droplets 48 are generally approximately 500 to approximately 10,000 microns in size. Once the large water droplet 48 becomes greater than the size of the bowl 84 the surface tension will no longer hold the large droplet 48 in the bowl 84 and the large droplet 48 flows out of the bowl 84 onto the substrate 22, which is generally hydrophobic. Gravity or downward flow, shown as downward direction 46, then pushes the large droplets 48 off of the mist eliminator 20 (see FIGS. 8 and 9). The large droplets 48 are too large to be carried by the inlet air flow 44 into the hood. The large droplets 48 fall to the ground or onto an adjacent weather hood 40 and are collected in a container or drain system. The air flow 47 exiting the weather hood and mist eliminators 20 is substantially free from water particles 45.

In one embodiment, the mist eliminator 20 is constructed from non-corrosive materials. In another embodiment, the substrate 22 and the frusto-conical shaped protrusions 24 are constructed from the same non-corrosive material. In yet another embodiment, the substrate 22 is constructed from a different non-corrosive material than the frusto-conical shaped protrusions 24. Another property of the suitable non-corrosive material is that is strong enough to withstand the load in and air intake force, such as in a weather hood or cooling tower. Suitable non-corrosive materials are, but not limited to polymers, aluminum, stainless steel, and combinations thereof. Suitable plastics are, but not limited to, polyesters, such as but not limited to polyethylene terephthalate (PET), polybutylene terephthalate (PBT), polytrimethylene terephthalate (PTT), polyethylene naphthalate (PEN) rigid polystyrene (PS), polyolefins, polypropylene, polystyrene, acrylonitrile butadiene styrene (ABS), polyamides or nylons, polyvinyl chloride (PVC), polyurethanes (PU), polycarbonates (PC), polyvinylidene chloride, polyethylenes (PE), fluoropolymers, such as, but not limited to, polyvinylfluoride, polytetrafluoroethylene, and combinations thereof.

Based upon the selection of the non-corrosive materials, the mist eliminator 20 can be formed by any suitable technique, for example, but not limited to, casting, forging, heat treating, welding, molding, or any suitable combination thereof. A mist eliminator 20 can be formed on existing parts or formed as its own part and added to the hood 40 by any suitable means, such as, but not limited to, a frame 90 disposed within the hood 40 (see FIG. 3). The overall dimensions of the mist eliminator 20 as shown in FIGS. 4 and 5 can be varied to adapt to different hood sizes. In one embodiment, the dimensions of the substrate 22 of the mist eliminator 20 include a first dimension 25 of approximately 10 millimeters to approximately 10,000 millimeters, a second dimension 31 of approximately 10 millimeters to approximately 30,000 millimeters and a third dimension 33 or thickness of approximately 0.01 millimeters to approximately 100 millimeters.

Figure 8:
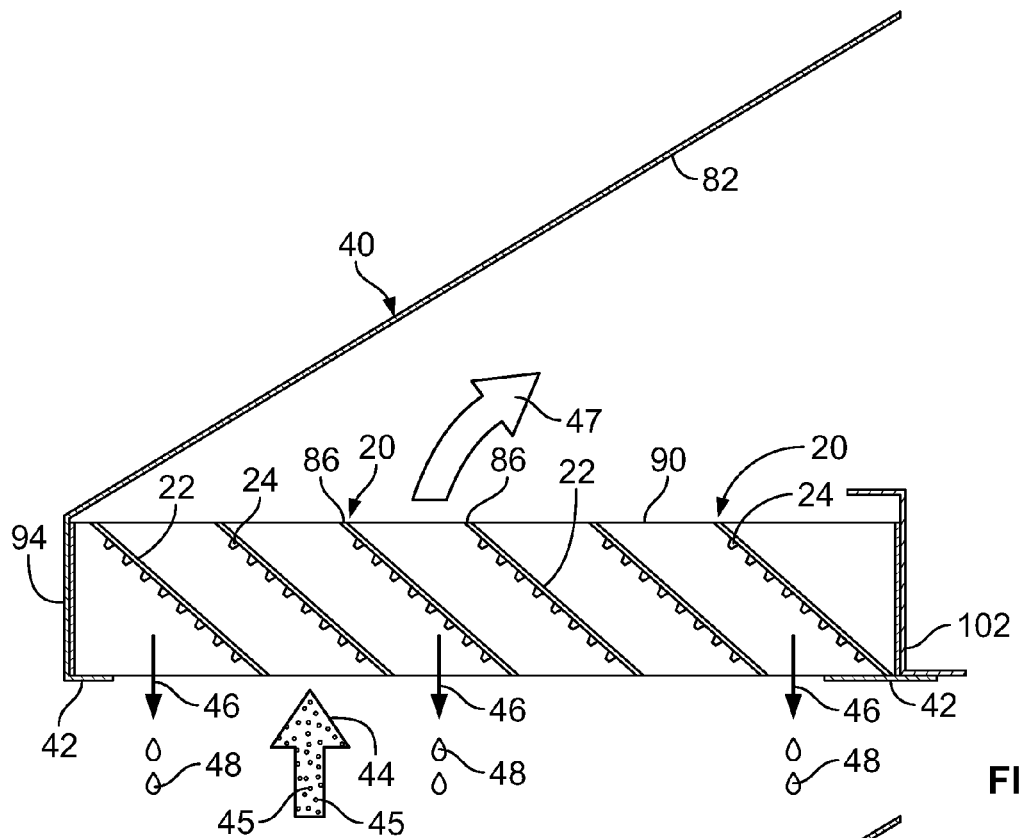
FIG. 8 is a sectioned view of the weather hood of the present system including a plurality of mist eliminators taken along line 8-8 of FIG. 3 of the present disclosure.
Figure 9:
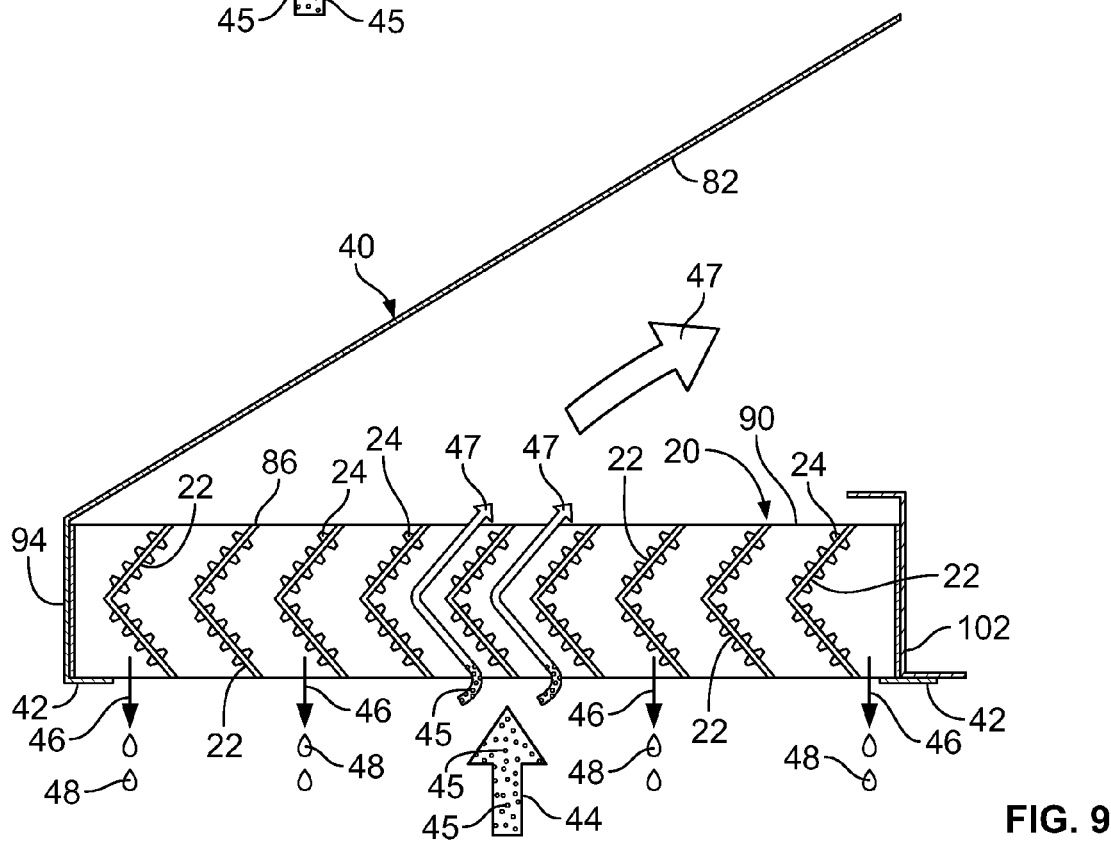
FIG. 9 is an alternative embodiment of the mist eliminator configuration of FIG. 8 of the present disclosure.

FIG. 8 is a sectioned view of the weather hood of FIG. 3, taken along line 8-8. Each of the plurality of mist eliminators 20 include at least one substrate 22 having a plurality of substantially frusto-conical shaped protrusions 24 disposed on at least one side thereof. In this embodiment the substrate 22 is substantially planar. As shown in FIG. 8, the moisture containing inlet air flow 44 contacts the plurality of mist eliminators 20 having a substantially planar substrate 22 and the plurality of frusto-conical shaped protrusions 24 at an approximately 45 degree angle. In operation, the inlet air flow 44 having water particles 45 is forced against the mist eliminators 20 which results in fine water particles 45 collecting or coalescing within the bowl 84 of the plurality of frusto-conical shaped protrusions 24. The air flow 47 exiting the mist eliminators 20 is substantially free of water particles 45. The water particles 45 collected by the bowl 84 in each of the plurality of frusto-conical shaped protrusions 24 forms large water droplets 48 which flow down the sides 88 of the frusto-conical shaped protrusions 24 to the substantially planar substrate 22. Once the large water droplets 48 arrive at the substantially planar substrate 22, the large water droplets 48 are pulled by gravity in a downward direction 46 off the mist eliminators 20. In one embodiment, the large water droplets 48 falling from the mist eliminators 20 are collected by a container or collection system along the weather hood 40 (not shown) or land and roll off the adjacent weather hood 40.

FIG. 9 provides an alternative embodiment of a mist eliminator 20. The mist eliminator 20 in FIG. 9 includes two substantially planar surfaces 22 that form a "V-shape." The V-shape mist eliminator 20 is formed using any suitable method, such as, but not limited to welding two substantially planar substrates 22 or by bending a single substantially planar substrate 22 to form the "V-shape." As shown, the moisture containing inlet air flow 44 is forced to flow over the "V-shaped" mist eliminator 20 in a tortuous "S" shaped pattern, which causes the inlet air flow 44 having water particles 45 to contact the substrate 22 and multiple surfaces of each of the mist eliminators 20 a plurality of times. As shown in FIG. 9, the "V-shaped" mist eliminator 20 includes plurality of frusto-conical shaped protrusions 24 on each of the substantially planar V-shaped substrates 22. The "V-shaped" mist eliminators 20 cause the moisture containing air flow 44 to bend thereby creating a centrifugal force that pushes the inlet air 44 having water particles 45 across the substrate 22 surface and the frusto-conical shaped protrusions 24 situated thereon. As the inlet air flow 44 having water particles 45 contacts the bowl 84 in each of the plurality of frusto-conical shaped protrusions 24, water particles 45 are collected from the moisture containing inlet air flow 44. Forcing the moisture containing inlet air flow 44 against the mist eliminators 20 results in fine water particles 45 collecting or coalescing within the bowl 84 of each of the plurality of frusto-conical shaped protrusions 24. The fine water particles 45 form into large droplets 48. Once the large water droplet 48 exceeds the size of the bowl 84, the large water droplet 48 moves along substantially planar substrate 22 of the mist eliminators 20 in a downward direction 46 or gravitational direction. The air flow 47 exiting the mist eliminators 20 is substantially free of water particles 45.

Figure 10:
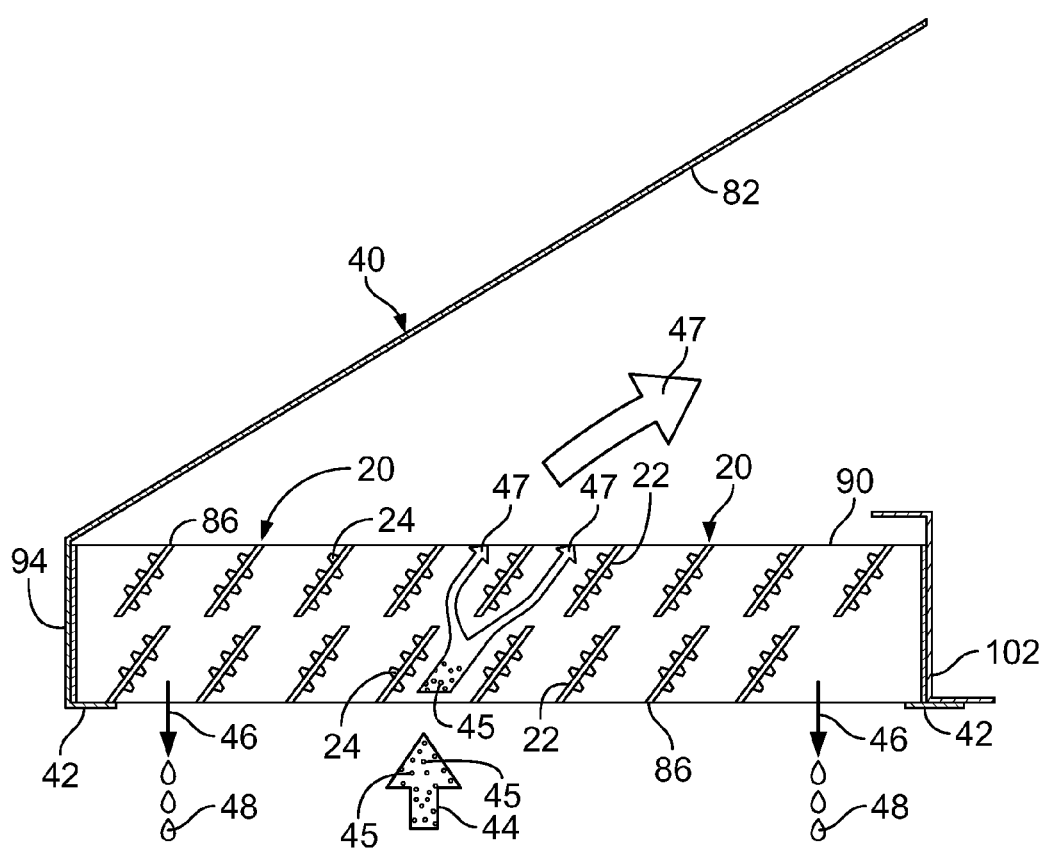
FIG. 10 is an alternative embodiment of the mist eliminator configuration of FIG. 8 of the present disclosure.

FIG. 10 provides an alternative embodiment of a mist eliminator 20. The mist eliminators 20 include a substantially planar substrate 22 and a plurality of frusto-conical shaped protrusions 24. Each of the mist eliminators 20 are staggered throughout the frame 90. As shown in FIG. 10, the moisture containing inlet air flow 44 is directed between two adjacent mist eliminators 20 and is diverted by a third mist eliminator 20. The arrangement of mist eliminators 20 causes the inlet air flow 44 having water particles 45 to contact a number of different mist eliminators 20. As the moisture containing inlet air 44 passes over the mist eliminators 20 water particles 45 are removed from the inlet air 44. The water particles 45 collect in the bowls 84 of the frusto-conical protrusions 24 until they are large enough to form large water droplets 48. Once the large water droplet 48 exceeds the size of the bowl 84, the large water droplet 48 moves along substantially planar substrate 22 of the mist eliminators 20 in a downward direction 46 or gravitational direction. The air flow 47 exiting the mist eliminators 20 is substantially free of water particles 45.

Figure 11:
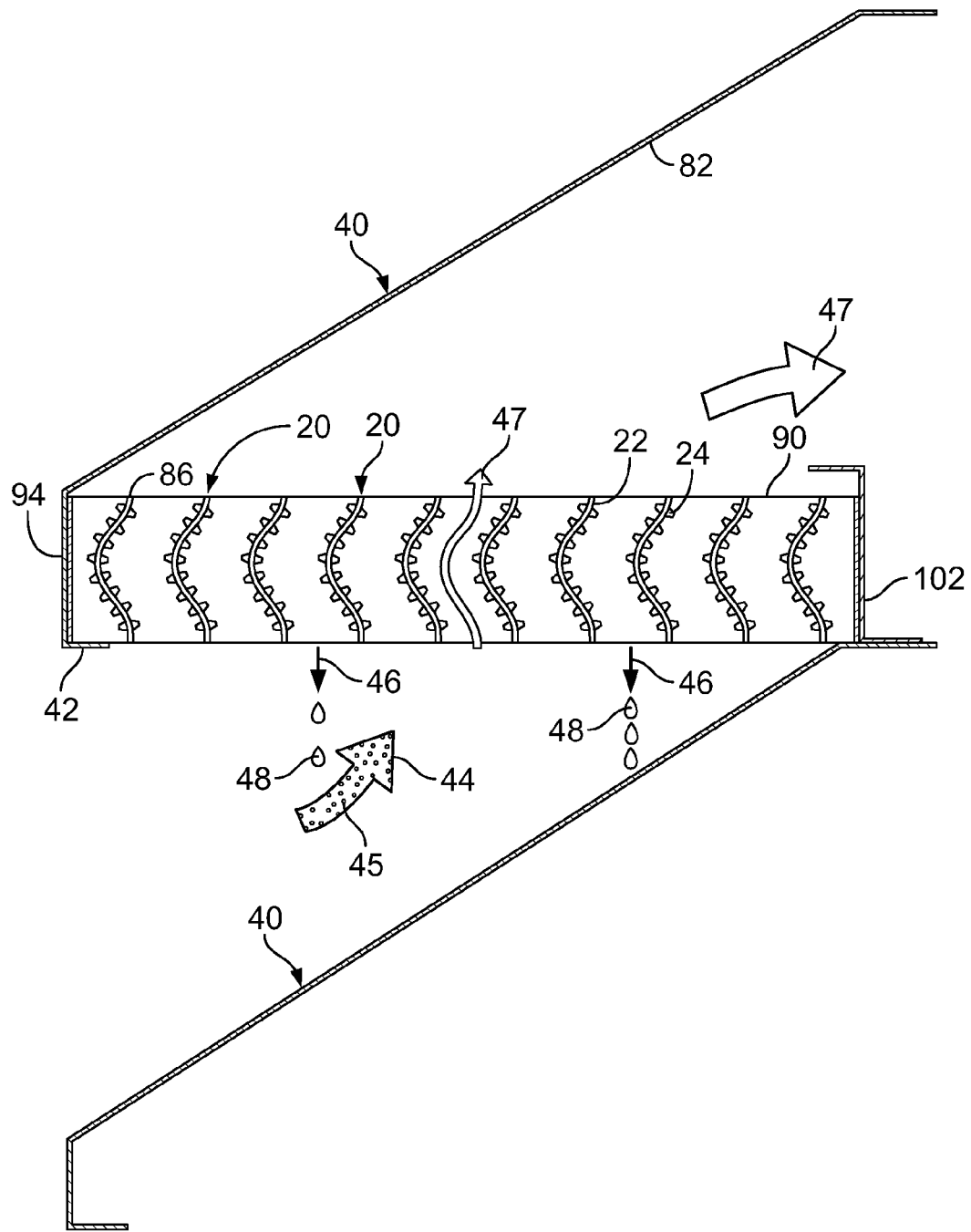
FIG. 11 is an alternative embodiment of the mist eliminator configuration of FIG. 8 of the present disclosure.
Figure 12:
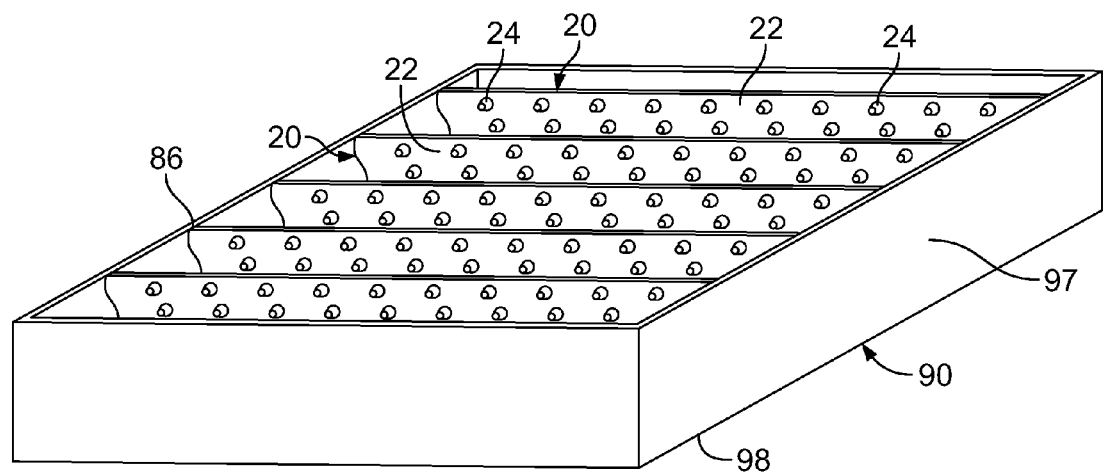
FIG. 12 is perspective view of a frame including a plurality of curved mist eliminators as shown in FIG. 11.

FIGS. 11 and 12 provide another alternative embodiment of a mist eliminator. The mist eliminators 20 include a substantially curved substrate 22 with a plurality of frusto-conical protrusions 24 disposed thereon. The frusto-conical shaped protrusions 24 are disposed on both sides of the substantially curved substrate 22. In another embodiment, the frusto-conical shaped protrusions 24 are disposed on one side of the substantially curved surface. The substantially curved mist eliminators 20 cause the moisture containing inlet air flow 44 to bend thereby creating a centrifugal force that pushes the inlet air 44 across the substantially curved substrate 22 surface and the frusto-conical shaped protrusions 24 situated thereon. The inlet air flow 44 having water particles 45 contacts and passes over the substantially curved surfaces 22 and plurality of frusto-conical protrusions 24 of the mist eliminators 20. As the moisture containing inlet air 44 passes over the mist eliminators 20 water particles 45 are removed from the inlet air 44. The air flow 47 exiting the mist eliminators 20 is substantially free of water particles 45. The water particles 45 collect in the bowls 84 of the frusto-conical protrusions 24 until they are large enough to form large water droplets 48. Once the large water droplet 48 exceeds the size of the bowl 84, the large water droplet 48 moves along substantially curved substrate 22 of the mist eliminators 20 in a downward direction 46 or gravitational direction.

As shown in FIG. 12, the substantially curved mist eliminators 20 are disposed in a frame 90. The frame 90 includes a plurality of sides 97 that hold the mist eliminators 20 in place. The frame 90 is inserted into the weather hood 40 (see FIG. 3) and in one embodiment, the bottom 98 of frame is supported by a plurality of flanges 42. Other configurations for the holding the plurality of mist eliminators are possible, as well as additional configurations for including the plurality of mist eliminators in an inlet air stream, such as in a weather hood 40.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mist eliminator comprising:
    a substrate; and
    a plurality of frusto-conical shaped protrusions disposed on the substrate;
    wherein the plurality of frusto-conical shaped protrusions have a geometry and are positioned at intervals that provide coalescence and retention of water particles from moisture containing air contacting the substrate and the plurality of frusto-conical shaped protrusions.

2. The mist eliminator of claim 1, wherein the substrate is substantially planar or substantially curved.

3. The mist eliminator of claim 1, wherein the geometry of the plurality of frusto-conical shaped protrusions includes a height, a first diameter, a second diameter, and a depression depth.

4. The mist eliminator of claim 1, wherein the height of the plurality of frusto-conical shaped protrusions is approximately 10 microns to approximately 5 millimeters.

5. The mist eliminator of claim 1, wherein the first diameter of the plurality of frusto-conical shaped protrusions is approximately 5 microns to approximately 1000 microns.

6. The mist eliminator of claim 1, wherein the second diameter of the plurality of frusto-conical shaped protrusions is approximately 100 microns to approximately 2 millimeters.

7. The mist eliminator of claim 1, wherein the depression depth of the plurality of frusto-conical shaped protrusions is approximately 2.5 microns to approximately 500 microns.

8. The mist eliminator of claim 1, wherein in the depression depth of the plurality of frusto-conical shaped protrusions is approximately one-half that of the first diameter of the plurality of frusto-conical shaped protrusion.

9. The mist eliminator of claim 1, wherein the interval between each of the plurality of frusto-conical shaped protrusions on the substrate is approximately 100 microns to approximately 10 millimeters.

10. The mist eliminator of claim 1, wherein the interval between each of the plurality of frusto-conical shaped protrusions on the substrate is approximately two times the second diameter.

11. The mist eliminator of claim 1, wherein the substrate and the plurality of frusto-conical shaped protrusions are constructed from a non-corrosive material.

12. The mist eliminator of claim 1, wherein the non-corrosive material comprises plastic, silicon, aluminum, stainless steel, and combinations thereof.

13. The mist eliminator of claim 1, wherein the plurality of frusto-conical shaped protrusions are integrally formed with the substrate.

14. The mist eliminator of claim 1, wherein the plurality of frusto-conical shaped protrusions are formed on both sides of the substrate.

15. A moisture removal system for a gas turbine, the moisture removal system comprising:
    a housing for supporting a primary filter, the housing operably connected with a gas turbine;
    a hood attached to the housing, the hood having a surface disposed at an acute angle relative to the horizontal; and
    a plurality of mist eliminators disposed within the hood, wherein each of the mist eliminators include:
        a substrate; and
        a plurality of frusto-conical shaped protrusions disposed on the substrate;
    wherein the plurality of frusto-conical shaped protrusions have a geometry and are positioned at intervals that provide coalescence and retention of water particles from moisture containing air contacting the substrate and frusto-conical shaped protrusions.

16. The moisture removal system of claim 15, wherein the substrate is substantially planar or substantially curved.

17. The moisture removal system of claim 15, wherein the plurality of mist eliminators are disposed within a frame.

18. The moisture removal system of claim 15, wherein the plurality of mist eliminators are positioned at an angle relative to the horizontal at approximately ten degrees to approximately ninety degrees.

19. A method for removing water particles from inlet air flowing to a gas turbine, the method comprising the steps of:
    providing a housing for supporting a primary air filter, the housing being operably connected with a gas turbine;
    providing a hood connected with the housing, the hood having a surface disposed at an acute angle relative to the horizontal;
    providing a mist eliminator disposed within the hood, the mist eliminator having a substrate covered with a plurality of frusto-conical shaped protrusions having a geometry and positioned at intervals that provide coalescence and retention of water particles;
    directing inlet air flow onto the mist eliminator, wherein geometry of the plurality of frusto-conical shaped protrusions coalesce and retain the plurality of water particles from the inlet air into a droplet.

20. The method of claim 19, wherein the geometry of plurality of frusto-conical shaped protrusions includes a height, a first diameter, a second diameter, and a depression depth.

* * * * *